UNITED STATES PATENT OFFICE.

CHARLES G. AM ENDE, OF HOBOKEN, NEW JERSEY.

IMPROVEMENT IN COMPOSITIONS FOR PRESERVING FOOD.

Specification forming part of Letters Patent No. 187,079, dated February 6, 1877; application filed August 1, 1876.

*To all whom it may concern:*

Be it known that I, CHARLES G. AM ENDE, of Hoboken, in the county of Hudson and State of New Jersey, have invented a new and Improved Preserving Composition, of which the following is a specification:

This invention relates to a new composition for preserving all kinds of meats, vegetables, and the like, and for protecting the same against injury by germs of putrefaction.

The invention consists in compounding boracic acid, either in a liquid or pulverous state, with acetic acid, in the proportion of about one drop of acetic acid to every ounce of boracic acid; but the proportion may be varied, according to the nature of the substance to be preserved, and of the atmosphere to which the same is to be exposed. The acetic acid may be used more or less diluted. Other salts may be added to the mixture, if desired.

The composition is applied to the substances to be preserved in substantially the manner in which preservatives are usually applied. The acetic acid in the composition prevents the formation of fungi; while the boracic acid prevents putrefaction chiefly by hindering the formation of bacteria.

I claim as my invention—

The composition of boracic acid and acetic acid, substantially as and for the purpose specified.

CHAS. G. AM EN

Witnesses:
  A. V. BRIESEN,
  ERNEST C. WEBB.